United States Patent [19]

Herbermann et al.

[11] Patent Number: 4,898,490
[45] Date of Patent: Feb. 6, 1990

[54] STRUCTURE FORMED FROM BALL JOINTED LINKS

[75] Inventors: Alfred F. Herbermann, Ann Arbor; Robert M. Carabbio, Saline, both of Mich.

[73] Assignee: Syron Engineering and Manufacturing Corporation, Saline, Mich.

[21] Appl. No.: 158,305

[22] Filed: Feb. 19, 1988

[51] Int. Cl.[4] .............................................. F16C 11/06
[52] U.S. Cl. ....................................... 403/56; 403/142
[58] Field of Search .................... 403/56, 76, 141, 142, 403/344

[56] References Cited

U.S. PATENT DOCUMENTS

| | | | |
|---|---|---|---|
| 354,976 | 12/1886 | Field | 403/142 X |
| 1,186,428 | 6/1916 | Newman | 403/56 X |
| 1,528,967 | 3/1925 | Bersted | 403/56 X |
| 2,752,726 | 7/1956 | Calverley | 403/142 X |
| 4,225,258 | 9/1980 | Thompson | 403/56 |
| 4,382,572 | 5/1983 | Thompson | 403/344 X |
| 4,471,595 | 9/1984 | Lanzafame . | |
| 4,648,733 | 3/1987 | Merkt | 403/56 |

Primary Examiner—Randolph A. Reese
Assistant Examiner—Peter M. Cuomo
Attorney, Agent, or Firm—Dykema Gossett

[57] ABSTRACT

A complex, load bearing structure which is formed from a series of steel links of a standard design which are joined to one another end to end. Each link has a ball portion on an end of an elongate central portion and a socket portion on the other end of the elongate central portion. The ball portion has a spherical or part-spherical outer surface and the socket portion has a part-spherical inner surface, and the ball portion and socket portion are so sized that the ball portion will fit snugly within the socket portion of a similar link for limited universal movement of the link and the similar link relative to one another. When the link and the similar link have been positioned in a proper relationship to one another, they are joined together by welding, soldering or adhesively. Preferably, each link is made integrally, in a single piece, from a steel tube which is copper plated on its exterior.

10 Claims, 3 Drawing Sheets

STRUCTURE FORMED FROM BALL JOINTED LINKS

BACKGROUND OF THE INVENTION

1. Field of the Invention

This invention relates to a structure which is formed from a multiplicity of links that are joined end to end in a ball and socket joint at the juncture of each pair of links. More particularly, this invention relates to a structure of complex design and construction, for example, an arm for transferring metal workpieces in an automotive parts stamping operation, which can be rapidly and precisely constructed from a multiplicity of links of standard sizes that are joined to one another end to end.

2. Description of the Prior Art

U.S. Pat. No. 4,648,733 (R. Merkt) discloses a conduit system which is made up of plastic tubular links that are joined end to end in articulating, ball and socket connections. However, there is no teaching in this reference that its disclosure is applicable to the construction of a device which must support a sizeable load cantilevered at the end thereof, for example, a stamping press work transfer arm, and the use of the preferred material of construction of this reference, polyamide, would be unsatisfactory for such a load bearing device because of the limited strength, low modulus of elasticity, and low resistance to elevated temperatures of such material. Thus, such work transfer arms are now usually custom designed and fabricated from ferrous metals, and as such these work transfer arms are heavy, expensive, and adjustable after construction and assembly, if at all, only with great difficulty. U.S. Pat. No. 4,471,595 (S. Lanzafame) also discloses a structure which is made up of a multitude of links that are pivotally connected to one another in an end to end manner. However, each link of the structure of this reference is complex in construction, being made up of a pair of separate clamping members with recesses therein for engaging clamping units, and with a threaded fastener for increasing the load of the clamping members on the clamping unit.

SUMMARY OF THE INVENTION

According to the present invention there is provided a structure which can be complex in design and construction, and which is formed from a multiplicity of standard links that are joined to one another in an end to end arrangement with a ball and socket joint at the juncture of adjacent links for at least limited universal motion therebetween. Each link is preferably formed from a steel tube with a ball portion on one end thereof and a socket portion on the other end thereof. The ball and socket are so sized that the ball of one link can be snapped into the socket of an adjacent link and will be frictionally held in place therein such that the position of the one link relative to the other will not change as a result of the weight of either of the links. However, the relative positions of the engaged links can be changed manually or with the use of a hand tool as may be required to adjust the overall configuration of the structure that is made up of such links until each adjacent pair of links is fixedly positioned to one another temporarily by a removable clamping device or permanently by soldering, welding or gluing. (In the case of a joint whose links are made of steel and are joined to one another by soldering or gluing, the links, quite desirably, can be repositioned relative to one another by heating the joint to a temperature high enough to melt the solder or soften the glue, a temperature which will not be high enough to cause an undesirable permanent change in the properties of the steel links.) By such an arrangement, a strong, lightweight structure of complex design and construction can be rapidly and relatively inexpensively assembled from a relatively finite number of standard types of such links, and even structures intended for very demanding load-bearing service in a hostile environment, such as work piece transfer arms for automotive parts stamping presses, can be advantageously constructed in this manner.

Accordingly, it is an object of the present invention to provide an improved structure which is made up of a multiplicity of links that are pivotally joined together. More particularly, it is an object of the present invention to provide an improved, load bearing structure which is made up of a multiplicity of links that are universally pivotally joined together. Even more particularly, it is an object of the present invention to provide a lightweight, relatively inexpensive work piece transfer arm of complex design and construction which is made up of a multiplicity of standard links that are universally pivotally joined together.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
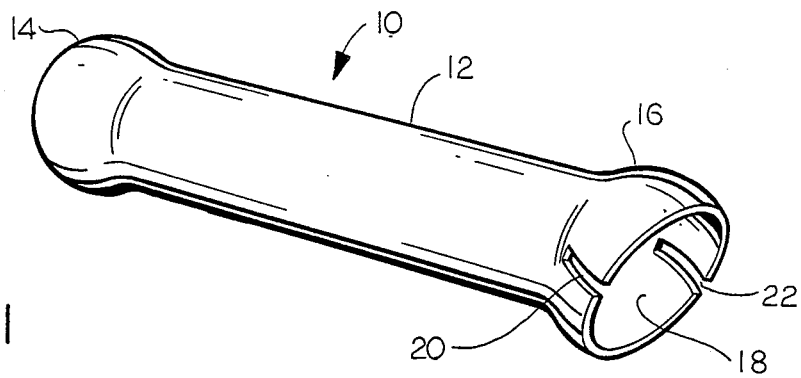
FIG. 1 is a perspective view of a preferred embodiment of a link according to the present invention.
Figure 2:
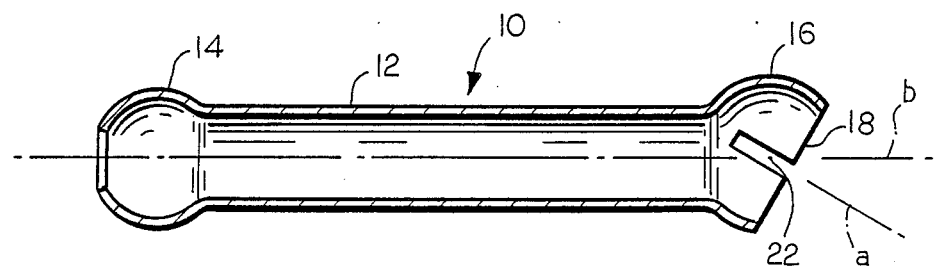
FIG. 2 is a longitudinal sectional view of the link illustrated in FIG. 1.

A link according to the present invention is identified generally by reference numeral 10 in FIGS. 1 and 2 and includes an elongate central portion 12, an enlarged ball portion 14 with a part-spherical outer surface, and an enlarged socket portion 16 with a part-spherical inner surface. The ball portion 14 is located at one end of the central portion 12 and the socket portion 16 is located at the other end of the central portion 12 and is provided with a circular opening 18 at the extremity thereof. The part-spherical outer surface of the ball portion 14 includes a diametral portion of such part-spherical outer surface, the part-spherical inner surface of the socket portion 16 includes at least a diametral portion of such part-spherical inner surface, and the relationship between the diameter of the part-spherical outer surface of the ball portion 14 and the diameter of the part-spherical inner surface of the socket portion 16 is such that the socket portion 16 of the link 10 will securely frictionally engage the ball portion of a second link of like construction, not shown in FIGS. 1 and 2, when the ball portion of the second link is inserted into the socket portion 16 of the link 10 through the opening 18. Preferably the part-spherical inner surface of the socket portion 16 includes material on both sides of the diameter thereof. In such an arrangement, the diameter of the circular opening 18 in the socket portion 16 will be at least slightly less than the diameter of the part-spherical surface of the ball portion 14, thus requiring a snapping action to insert the ball portion 14 of a first link 10 into the socket portion 16 of a like link 10.

To facilitate the snapping action of the insertion of a ball portion of a link like the link 10 into the socket portion 16 of the link 10, the socket portion 16 is preferably provided with at least one slot, shown as diametrically opposed first and second slots 20 and 22, extending from the opening 18 partly into the socket portion 16, past the diametral portion of the part-spherical inner surface thereof. Such a slot or slots helps to provide all required deformation needed for the insertion of a ball portion into a socket portion which helps to enhance the snapping during such insertion. Further, such a slot or slots also facilitates the clamping of a socket portion to a ball portion.

To enhance the degree of universal movement that can be provided between the link 10 and the like link whose ball portion is engaged by the socket portion 16, the socket portion 16 is preferably provided with a central axis a which is at some finite acute angle, for example, approximately 30°, with respect to a longitudinal central axis b of the central portion 12 of the link 10. Of course, any such angle in the range of 0–90° is feasible. Or explained differently, the extremity of socket portion 16 defines an end face at a first plane, a second plane being defined perpendicular to the central axis of central portion 12. The first and second planes intersect at an acute angle that is distinct from the above-discussed angle.

The link 10 is formed integrally, in a single piece, from a tubular member, and when it is to be used as an element of a load bearing structure, for example, as an element of a stamping press work transfer arm, or in a high temperature or otherwise hostile environment, it is preferably formed from a steel tube. The enlarged ball portion 14 and the enlarged portion 16 of the link 10 may be formed in such a steel tube by the urethane method, by hydroforming or by spinning, which are known methods for re-shaping metallic objects. Strong, lightweight links corresponding to the link 10 for use in stamping work press transfer arms can be satisfactorily produced in standard lengths from 3 inches into 12 inches, measured from the center of the ball portion 14 to the center of the socket portion 16, for example, in standard lengths of 3 inches, 6 inches, 9 inches and 12 inches, from steel tubing with an outside diameter of approximately 1.75 inches and with a thickness of approximately 0.049 inches, reformed at the ends of each such tube to incorporate a ball portion part-spherical outside surface and a socket portion part-spherical inside surface of approximately 2.50 inches in diameter. Further, it has been found to be advantageous to copper or tin plate the exterior and/or interior of the link 10 for corrosion resistance and to enhance the soldering of the joint. Of course, such plating of the link 10 on its exterior surface also enhances its appearance.

Figure 3:
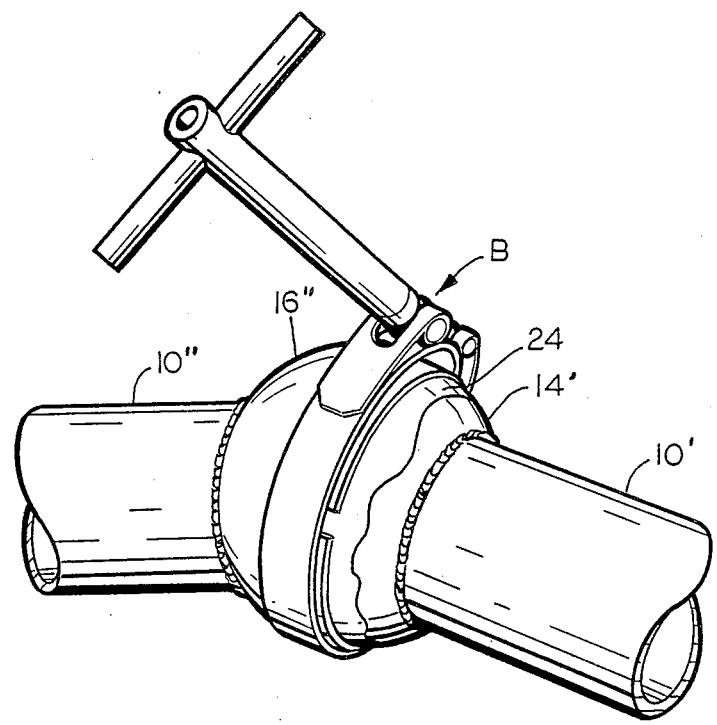
FIG. 3 is fragmentary perspective view illustrating a step in the assembly of a structure from a pair of like links of the illustrated in FIGS. 1 and 2.

As is shown in FIG. 3, a structure may be formed from a pair of links 10' and 10", which are alike in construction other than for a possible difference in length, and each of which may considered to be similar to the link 10 of FIGS. 1 and 2. The structure is formed by inserting a ball portion 14' of the link 10' into a socket portion 16" of the link 10". Because of the ball and socket fit between the ball portion 14' and the socket portion 16", limited universal movement therebetween can be achieved, usually by hand pressure, to permit the forming of a complex, custom structure from such links 10' and 10". When such a structure has been formed, the links 10' and 10" may be permanently or semi-permanently secured to one another by clamping them with a constricting clamping band B which may be of conventional construction. The band B engages the outside surface of the socket portion 16" of the link 10" to increase the clamping load which is applied to the outside surface of the ball portion 14' of the link 10'. When the constricting clamping band B is in place, as described, the links 10' and the 10" are permanently secured to one another by soldering, welding, gluing, by a mechanical interlock, for example, by a threaded fastener (not shown) or otherwise. Preferably, when the link 10' and the link 10" are each formed from steel, they are secured to one another by the use of a tin solder, as shown at 24, which will readily wick or seep into the joint between the socket portion 16" and the ball portion 14', especially if the outside surfaces of the links 10' and 10" are copper coated. An important advantage in the use of a tin solder or an organic heat softenable adhesive in a joint that is made up of steel members is that the position of the members relative to one another can later be changed by heating the joint to a temperature which will liquify the solder or adhesive, as the case may be, a phenomenon which will occur at a temperature which is below that which will lead to dimensional change or other permanent undesirable change in the steel members.

Figure 4:
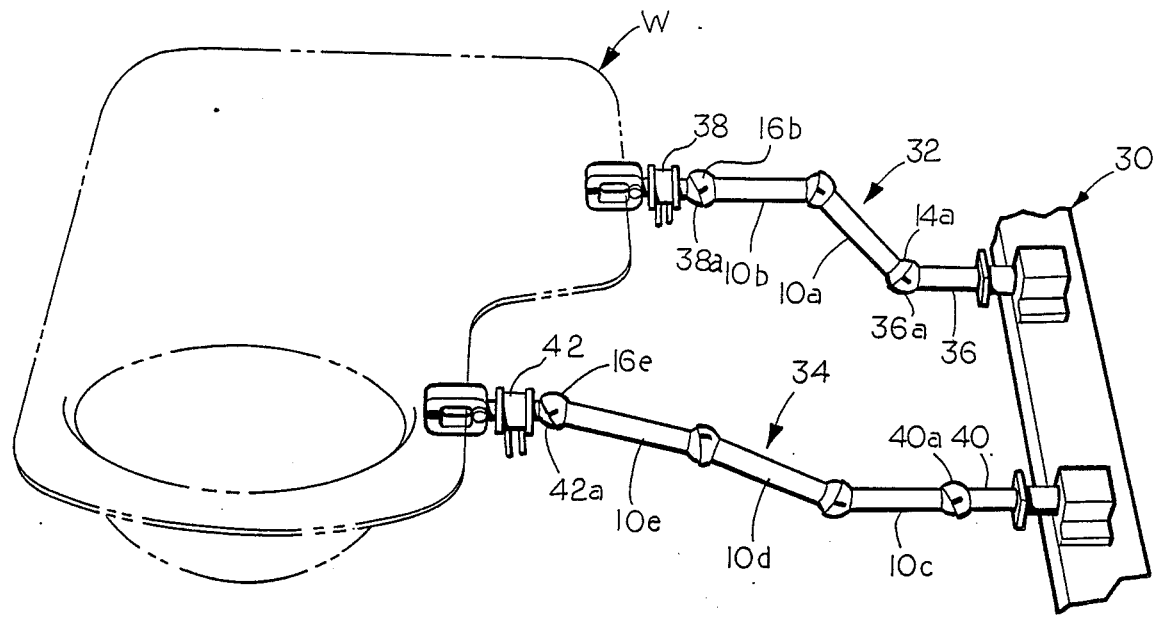
FIG. 4 is a fragmentary perspective view of an apparatus for handling large, heavy objects, which apparatus includes a pair of object-engaging arms each of which includes at least a pair of links of the type illustrated in FIGS. 1 and 2.

FIG. 4 illustrates a portion of a stamping press work transfer device, identified generally by reference numeral 30, which has a first work transfer arm 32 and a second work transfer arm 34. The first work transfer arm 32 is made up of two links 10a and 10b joined end to end, which are like the link 10 of FIGS. 1 and 2 and like each other, except for any desired variation in length therebetween, an inner member 36 which extends from the link 10a to the work transfer device 30, and a gripper type outer member 38 which extends from link 10b to engage a workpiece W, which is shown in phantom. The second work transfer arm 34 is shown as being made up of three links, 10c, 10d and 10e, which are joined end to end and which are like the link 10 of FIG. 1 and like each other, except for any desired variation in length therebetween, an inner member 40 which extends from the link 10c to the work transfer device 30, and a gripper type outer member 42 which extends from the link 10e to engage the workpiece W at a location which is spaced from the location where the workpiece W is engaged by the outer member 38 of the first work transfer arm 32. Because of the design of the links 10a and 10b of the first work transfer arm 32, the inner member 36 is provided with a socket portion 36a which is like the socket portion 16 of the link 10 for engaging a ball portion 14a of the link 10a, and the outer member 38 is provided with a ball portion 38a which is like the ball portion 14 of the link 10 and which is engaged by a socket portion 16b of the link 10b. Likewise, the inner member 40 of the second arm 34 is provided with a socket portion 40a for engaging a ball portion 14c of the link 10c, and the outer member 42 is provided with a ball portion 42a which is engaged by a socket portion 16e of the link 10e.

Figure 5:
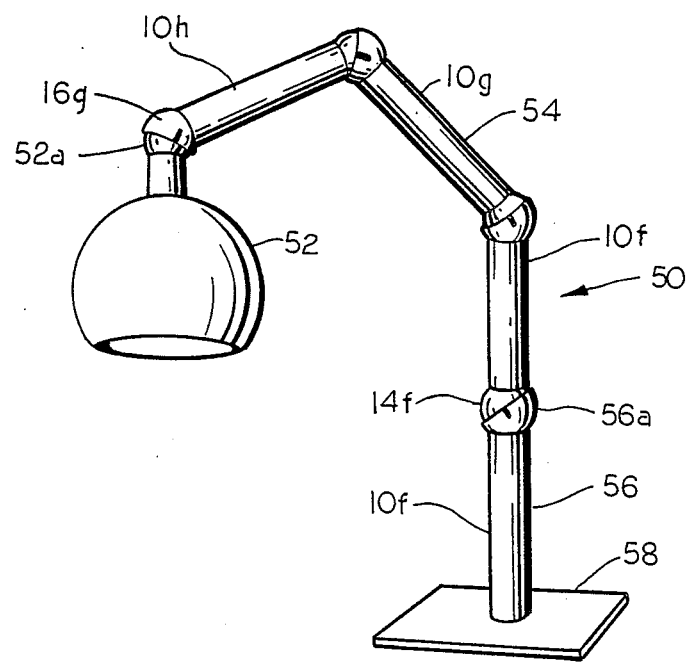
FIG. 5 is a perspective view of a floor lamp which is assembled from elements including at least a pair of links of the type illustrated in FIGS. 1 and 2.

FIG. 5 illustrates a floor lamp, indicated generally by reference numeral 50, which is made up of a lamp fixture 52, and an arm 54 which supports the lamp fixture 52. The arm 54 includes first and second links 10f and 10g which are joined end to end and which are like the links 10 of FIGS. 1 and 2 and like each other, except for any desired variation in length therebetween, and an inner member 56 which extends from the link 10f for connection to a wall, not shown. The lamp fixture 52 is provided with a ball portion 52a which is engaged by a socket portion 16g of the link 10g, and the inner member 56 is provided with a socket portion 56a which engages a ball portion 14f of the link 10f. Preferably, the arm 54, including the inner member 56 and its socket portion 56a, the link 10f, the link 10g and the lamp fixture 52 with its ball portion 52a, are all open on the interior thereof to permit the wiring for a lamp, not shown in the lamp fixture 52, to be run on the inside of the arm 54.

Figure 6:
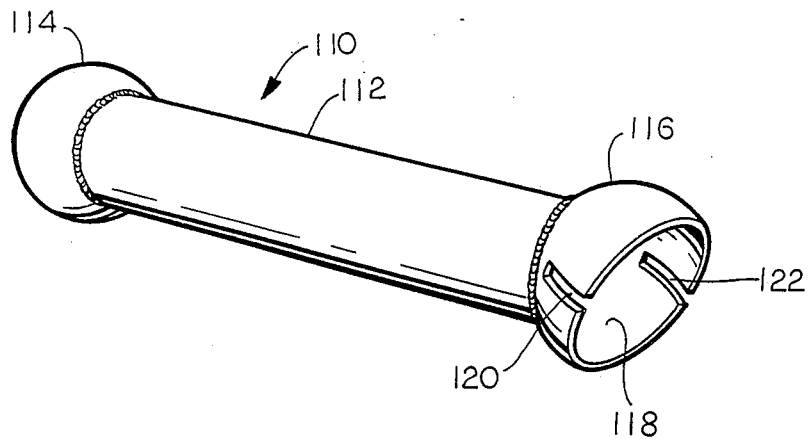
FIG. 6 is a view similar to FIG. 1 of an alternative embodiment of a link according to the present invention.
Figure 7:
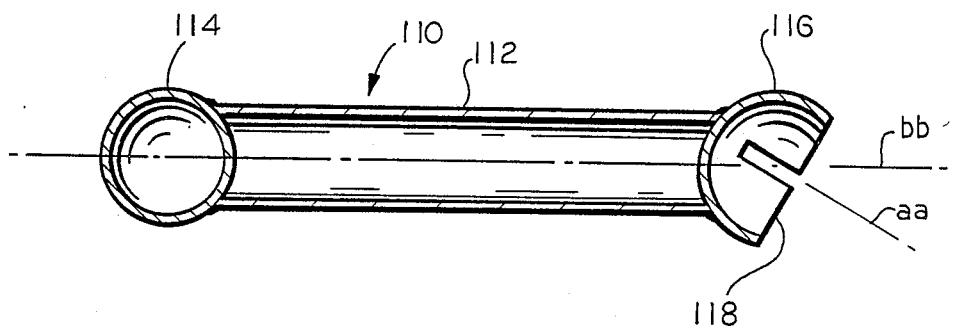
FIG. 7 is a view similar to FIG. 2 of the link illustrated in FIG. 6.

FIGS. 6 and 7 illustrate a modified embodiment of a link, which is identified generally by reference numeral 110, according to the present invention. The link includes a separate elongate central portion 112, a separate enlarged ball portion 114 with a spherical outer surface, and a separate socket portion 116. The ball portion 114 and the socket portion are welded or otherwise secured to opposite ends of the central portion 112. As in the case of the socket portion 16 of the link 10 of the embodiment of FIGS. 1 and 2, the socket portion 116 of the link 110 of the embodiment of FIGS. 6 and 7 is provided with a part-spherical inner surface and a circular opening, identified by reference numeral 118, at the extremity thereof, and is provided with at least one slot, shown as diametrically opposed first and second slots 120 and 122, extending from the opening 118 partly into the socket portion 116, past the diametral portion of the part-spherical inner surface thereof. Likewise, the ball portion 114 has a spherical outer surface which is adapted to be snugly engaged by a portion of a second link that is like the link 110, not shown. The socket portion 116 of the link 110 is provided with a central axis aa which is at some finite acute angle, for example, approximately 30°, with respect to a longitudinal central axis bb of the central portion 112 of the link 110. Of course, any such angle in the range of 0–90° is feasible.

In the embodiment of FIGS. 6 and 7, the ball portion 114 of the link 40, unlike the ball portion 14 of the embodiment of FIGS. 1 and 2, is closed in all locations that are not engaged by a socket portion 116 of a like link 110. Thus, it is possible to assemble a buoyant structure from a plurality of like links 110 which is liquid tight and such a structure can be used as a flotation device in connection with bridge building or for amphibious vehicles.

Although the best mode contemplated by the inventors for carrying out the present invention as of the filing date hereof has been shown and described herein, it will be apparent to those skilled in the art that suitable modifications, variations and equivalents may be made without departing from scope of the invention, such scope being limited solely by the terms of the following claims.

What is claimed is:

1. A structure which is adapted to support a load, said structure comprising:
    a first link, said first link having;
    an elongate metallic central portion extending along a central axis; and
    a ball portion having a part-spherical outer surface, said ball portion being attached to said central portion of said first link at an end of said central portion of said first link; and
    a second link, said second link having;
    a socket portion having a part-spherical inner surface and an opening at an extremity of said socket portion, said socket portion being attached to said central portion of said second link at an end of said central portion of said second link;
    said ball portion of said first link being engaged in said socket portion of said second link with said elongate central portion of said first link extending through said opening in said socket portion of said second link;
    said first link initially being capable of limited universal movement with respect to said second link when said ball portion of said first link is engaged in said socket portion of said second link;
    securing means securing said ball portion of said first link to said socket portion of said second link in a predetermined, load bearing position of said second link with respect to said first link; and
    said extremity of said socket portion defining an end face at a first plane, a second plane being defined perpendicular to said central axis of said elongate central portion, said first plane and said second plane intersecting at an acute angle.

2. A structure according to claim 1 wherein said elongate metallic central portion of said first link and said ball portion are formed integrally in a single piece from a first tubular member.

3. A structure according to claim 2 wherein said elongate metallic central portion of said second link and said socket portion are formed integrally in a single piece from a second tubular member.

4. A structure according to claim 3 wherein said first tubular member is a steel tube and wherein said second tubular member is a second steel tube.

5. A structure according to claim 4 wherein each of said first steel tube and said second steel tube is plated with a corrosion resistant metallic material on one of its exterior surface and its interior surface.

6. A structure according to claim 4 and further comprising heat-softenable adhesive means securing said ball portion of said first link to said socket portion of said second link in a predetermined portion of said second link with respect to said first link.

7. A structure according to claim 6 wherein said heat-softenable adhesive means comprises a tin solder.

8. A structure according to claim 1 wherein said part-spherical outer surface of said ball portion of said first link includes a diametral portion of said part-spherical outer surface, wherein said socket portion of said second link includes a diametral portion of said part-spherical inner surface, and wherein the diameter of said part-spherical inner surface is not substantially greater than said part-spherical outer surface, whereby said socket portion of said second link will tightly engage said ball portion of said second link.

9. A structure according to claim 8 wherein said second link is circular in configuration and has a diameter which is smaller than said diameter of said part-spherical outer surface of said ball portion of said first link, and wherein said socket portion of said second link comprises at least one slot extending from said opening of said socket portion at least to said diameter of said part-spherical inner surface of said socket portion.

10. A structure according to claim 9 wherein said at least one slot comprises diametrically opposed first and second slots.

* * * * *